United States Patent [19]

Greinacher

[11] 4,048,026

[45] Sept. 13, 1977

[54] PROCESS FOR THE ENRICHMENT OF EUROPIUM CHLORIDE

[75] Inventor: Ekkehard Greinacher, Essen, Germany

[73] Assignee: Th. Goldschmidt AG, Germany

[21] Appl. No.: 410,104

[22] Filed: Oct. 26, 1973

[30] Foreign Application Priority Data

Nov. 6, 1972 Germany .............................. 2254245

[51] Int. Cl.$^2$ .......................... C01F 17/00; C25B 1/24
[52] U.S. Cl. ........................................ 204/61; 204/94
[58] Field of Search ................................... 204/61, 94

[56] References Cited

U.S. PATENT DOCUMENTS

| 2,712,523 | 7/1955 | Alpert et al. | 204/61 |
| 3,341,437 | 9/1967 | Wood | 204/61 |

Primary Examiner—F.C. Edmundson
Attorney, Agent, or Firm—James E. Bryan

[57] ABSTRACT

This invention relates to a process for the enrichment and recovery of europium chloride in a mixture of rare earth halides which comprises adding sufficient alkali, alkaline earth, or rare earth fluoride to a melt of rare earth halides that the melt contains at least 4% by weight of fluoride, electrolyzing the mixture in the melt, separating residual salts, cooling, and washing said residual salts with water.

2 Claims, No Drawings

PROCESS FOR THE ENRICHMENT OF EUROPIUM CHLORIDE

The rare earths are generally subdivided into the so-called cerite earths and the yttrium earths. Within the group of the cerite earths, europium has acquired particular importance in the last few years as an activator in luminous substances, and as a neutron captor in the control elements of nuclear reactors. In the ores of the rare earths, such as in monazite sand or in bastnaesite, for example, europium is contained, however, only in very small amounts. For recovering europium and the compounds thereof, an enrichment therefore must be first carried out.

This is the object on which the present invention is based. It relates, therefore, to a process for the enrichment of europium chloride in a mixture of halides of the rare earths.

In order to carry out a fusion electrolyis of the rare earths, they first must be coverted into the water-free chlorides. This can be successfully achieved in a simple manner by a dry decomposition. It is known for example from German Pat. No. 891,251 to react the ores of the rare earths with chlorine and carbon in a reaction furnace at 1000° C. The water-free chloride produced is discharged continuously and is tapped from time to time.

The water-free mixture of the chlorides of the rare earths that is produced in this manner then may be electrolyzed in the melt in ceramic or iron and/or graphite cells. At that time a misch metal is separated at the cathode which is composed about half by weight of cerium and to 39 to 46% by weight of lanthanum, neodymium, and praseodymium. In this connection, cerium and praseodymium are separated in a preferred fashion, while lanthanum and neodymium are separated still quite well. In the course of the electrolysis, samarium is enriched in the melt. There remains a so-called residual salt which contains the principal amount of the samarium and other salts which are difficulty separable or not at all.

The europium behaves in an unusual manner. When a material balance is drawn up regarding the process, only a limited fraction of the europium is found in the misch metal. Contrary to expectations, however, no enrichment can be noticed in the residual salt either, as is the case for samarium. It is assumed that the europium escapes in the form of its subchloride with the anodically-formed chlorine, but this cannot as yet be unequivocally proved.

It has now been found suprisingly that, by setting a specific fluoride content in the salt melt during the electrolysis, the europium remains in the residual salt in a predominant quantity thereof, and that it can be dissolved out of the salt by washing with water.

In the inventive process, sufficient alkali, alkaline earth, or rare earth fluorides are added to the chlorides of the rare earths that the melt contains at least 4% by weight of fluoride, the mixture is electrolyzed in known manner in the melt, the residual salt is separated, and washing with water is effected after cooling.

In order to obtain as high as possible an enrichment of the europium in the residual salt, the eletrolysis is performed in the melt preferably up to a fluoride content of approximately 18 to 20% by weight.

By use of the inventive process, it is surprisingly possible to succeed in enriching the europium chloride in the residual salt in water-soluble form up to approximately 95% of the starting quantity. This means that about 1 to 2% by weight of europium halide may be contained in the residual salts.

From the aqueous europium salt concentrates obatained, the europium may be further enriched in known manner, for example by means of the liquid-liquid-distribution process, and may be obtained in very pure form.

It was already known in the art to add small quantities of fluorides to the water-free chlorides during the fusion electrolysis. The fluoride quantities employed therefor were, however, too small to bring about the effect of of the inventive process. In contrast to the teaching of the inventive process, it was rather sought to maintain the fluoride content in the melt as low as possible inasmuch as the quantity of the remaining residual salt depends upon the amount of the fluoride added, and larger amounts of fluoride reduce the yields relative to misch metal. For this reason, only that amount of fluoride was selected which was necessary to achieve the intended liquefaction of the melt and/or the reduction of the melting point of the melt. Beyond this, it was not known in the art how to extract europium from the residual salts of the fusion electrolysis by treating the residual salts with water.

It will be obvious to those skilled in the art that many modifications may be made within the scope of the present invention without departing from the spirit thereof, and the invention includes all such modifications.

What is claimed is:

1. A process for the enrichment of europium chloride in a mixture of rare earth halides which comprises adding sufficient alkali, alkaline earth, or rare earth fluoride to a melt of rare earth halides containing europium chloride that the melt contains at least 4% by weight of fluoride,
electrolyzing the mixture in the melt,
separating residual salts, cooling,
and washing said residual salts with water.

2. A process according to claim 1 in which said electrolysis is performed in the melt up to a fluoride content of approximately 18 to 20% by weight.

* * * * *